July 11, 1967 W. H. W. SCHULLER 3,330,008
APPARATUS FOR MANUFACTURING SLIVERS OR YARNS
FROM GLASS FILAMENTS OR THE LIKE
Filed Sept. 21, 1964 3 Sheets-Sheet 1

INVENTOR.
Werner Hugo Wilhelm
Schuller
BY
Michael J. Striker

United States Patent Office 3,330,008
Patented July 11, 1967

3,330,008
APPARATUS FOR MANUFACTURING SLIVERS OR YARNS FROM GLASS FILAMENTS OR THE LIKE
Werner Hugo Wilhelm Schuller, Dr. Kurt-Huber-Strasse 14, Munich-Grunwald, Germany
Filed Sept. 21, 1964, Ser. No. 397,721
7 Claims. (Cl. 19—150)

The present invention relates to textiles and in particular to a textile treating apparatus of the type which is used for the manufacture of slivers or yarns composed of fibers made of glass or similar materials.

Known apparatus of this type includes a rotary drawing drum to which filaments are applied so as to be drawn thereby, and the drawn filaments are then moved away from the rotary drawing drum before passing through a complete revolution about the rotary drum and converted into fibers, the fibers passing from the drum into spinning tubes from which they are withdrawn in the form of slightly twisted slivers. The fibers are separated from the drum by a structure such as a suitable doctor blade which extends axially along and engages the drum, although other structure such as suitable sheet metal guides or baffles acting as a barrier to the wind generated by the rotation of the drum or internal zones of the drum which are alternately subjected to pressure above and below atmospheric pressure, with the drum being perforated, can be used for the same purpose.

With such a construction it is possible by regulation of the speed of rotation of the drawing drum to provide a predetermined thickness for the slivers which are derived from the apparatus. The slivers which are made in this manner are wound on suitable spools which are rotated at extremely high speeds, as is well known in the art of manufacturing glass yarns, and because of these high speeds it is necessary to provide special constructions particularly for the yarn guides. The yarn guides used for apparatus of the above type are known slotted, friction drums.

In order to achieve slivers of uniform thickness and high quality the fibers which form the slivers which are to be drawn are preferably derived from a plurality of elongated glass rods which form the raw material from which the filaments are derived, these rods being arranged close to each other in one or more rows adjacent to the drawing drum and by raising the temperature of the rods adjacent one of their ends it is possible to withdraw the filaments from the softened ends of the rods an to provide in this way the filaments which are delivered to the rotary drawing drum to be drawn thereby. Structures of this latter type have been standardized in recent times.

When manufacturing relatively thin slivers as, for example, slivers which have a metric number of 8 or 10, these numbers signifying the number of thousands of meters of yarn which weight 1 kilogram, there is a considerable disadvantage involved in the increased spooling speed above a limit where the evenness of the sliver starts to suffer, which speed is necessary to produce such a thin sliver from the amount of filaments produced within a certain time interval by one of said standard constructions. Thus, when manufacturing a number 10 sliver the slotted drum of the yarn guide must rotate at a minimum speed of 965 r.p.m. which corresponds to a drawing speed of 650 meters per minute. Even when producing a sliver of number 5 thickness, the drum must still rotate at a speed of more than 482 revolutions per minute, which corresponds to a linear yarn speed of 325 meters per minute, and even when manufacturing a sliver having the metric number 2, 3 the linear yarn speed must be 150 meters per minute. When dealing with slivers moving up to these high speeds, many times higher than the speed of other fiber strands encountered in the manufacture of artificial yarns where a linear speed of 60 meters per minute is normal, the fluffy slivers are unavoidably subjected to very high stresses. It thus cannot often be avoided that such thin slivers having, for example, the metric number 10, are damaged during their manufacture in such a way that when the sliver moves along the slotted drum abrasion occurs at the edges of the slot and the sliver becomes damaged. At high speeds as indicated above such injury is unavoidable. The quality of the sliver also suffers when operating at high speeds, because the slivers often slip laterally from the endfaces of the packing at the reversal points of the criss-cross movement.

In order to increase the rate of the production, it has been decided in recent times to increase the supply of fibers, determined by the speed of rotation of the drawing drum the number of spinning nozzles or glass rods and the spinning speed, which of course necessitates even higher speeds of the yarn guide. When it is remembered that even with relatively slow machines manufacture of very fine slivers has always been a problem, then it is clear that with the increased speeds the manufacture of such fine slivers becomes even more difficult, and in fact such slivers cannot in many cases even be manufactured at all. The difficulties are not avoided by manufacturing only thicker slivers since, as is pointed out above, the difficulties are encountered even when operating with slivers which are considerably thicker than metric number 10. Their guiding in the slotted guides as well as the pressure of the spool on the rotating slotted friction drum results in excessive damaging of the fibers and a reduction in the length of the staple fibers which are collected as slivers because of the friction which is necessarily considerably increased. There takes place a splintering or breaking of the glass fibers often in dust form.

Moreover, when the slivers start to be wound onto a spool and the slivers are introduced into the slotted guide of the rapidly rotating slotted, friction drum, there are difficulties because of the fact that the sliver as a result of the very high speed of the drum, is initially engaged and drawn with an unavoidable jerk. The result is very often tearing of the sliver since it cannot withstant the stresses encountered under these circumstances.

Moreover, during winding of the sliver onto a spool, where a very high metric number is involved, an extremely hard spool will result and any unevenness will propagate itself throughout the body of the spool, and such unevenness results in jumping and undesired movement of the spool, which also results in tearing of the sliver and in an undesired out-of-roundness of the spool body.

A further highly important disadvantage resides in the fact that the sliver is withdrawn too quickly from the spinning tube as a result of the high speed of rotation of the spool, so that there is insufficient time for the fibers to be spun sufficiently and to mat sufficiently so as to achieve a sliver with the desired slight twist. The high speed of the sliver does not permit additional desired twisting to be provided from the time it is initially formed up to the time that it is wound onto a spool.

It is accordingly a primary object of the present invention to provide a sliver manufacturing apparatus which will avoid the above drawbacks.

In particular it is an object of the present invention to provide extremely fine slivers at a very high rate of speed without, however, encountering the above-discussed problems of the prior art.

In particular, it is an object of the present invention to provide extremely fine slivers with a high speed operation while at the same time providing a relatively low speed of movement of the slivers during winding thereof onto a suitable spool.

Yet another object of the present invention is to provide a structure which makes it possible to achieve from a single drawing drum a plurality of slivers of equal or different thickness.

In particular, it is an object of the present invention to provide a structure which makes it possible because of the considerably slower withdrawal from the spinning tube (allowing the fibers to float within the tube for a longer time) for the air current, as means of transport, to intermingle the staple fibers to a higher degree and also to create a more convenient twist. Because of the better intermingling of the fibers a fiber body is produced, which will withstand a higher pull and in some cases make it unnecessary to twist the sliver as strong as formerly necessary. Because of the rather slow withdrawal sufficient time is available to submit the sliver to additional treatments on its way between the spinning tube and the spooling device. Such an additional treatment may consist in the application of sizing or in additional stretching or twisting of the sliver. It is also possible to collect the individual slivers to form some kind of a "roving" or "yarn." Another advantage consists in the better build of the bobbin package, which is also due to the rather slow spooling speed. Furthermore a considerable increase in quality of the slivers can be observed since the fibers are no longer destructed within the slot of the slotted drum, and can be wound up as an unmolested band of even thickness.

With the above objects in view the invention includes, in an apparatus for manufacturing slivers composed of staple fibers made of glass or similar materials, a rotary drawing drum to which a plurality of individual filaments are applied, these filaments being applied to one side of the drum and passing around the latter to an opposite side thereof during drawing of the filaments. A plurality of elongated hollow guides have openings directed toward this opposite side of the drum to receive staple fibers consisting of pieces of the endless filaments therefrom, and these elongated hollow guides are axially distributed along the drum for receiving fibers from predetermined portions of the drum. In accordance with the invention there are at least two such guides for one drum, so that the fibers are divided between at least two guides, and suitable spinning tubes communicate with the guides for receiving the fibers therefrom and for slightly twisting them, the slivers being withdrawn through suitable nozzles of the spinning tubes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
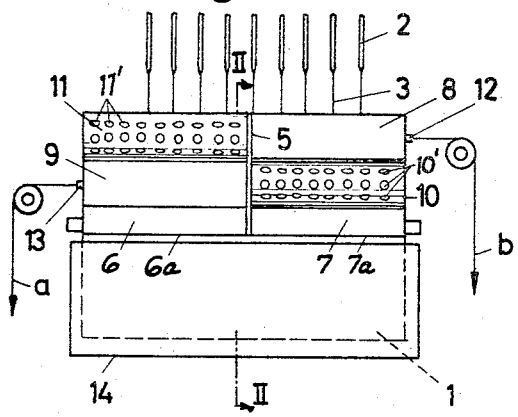
FIG. 1 is a diagrammatic front elevation of a structure according to the invention, the structure of FIG. 1 being shown on a reduced scale.
Figure 2:
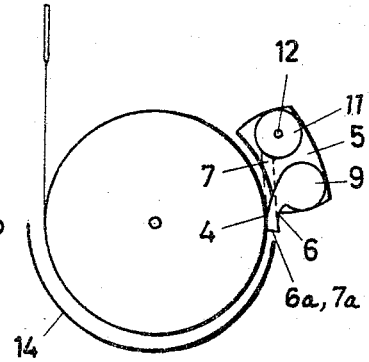
FIG. 2 is a diagrammatic side section of the structure of FIG. 1 taken along line II—II of FIG. 1.
Figure 8:
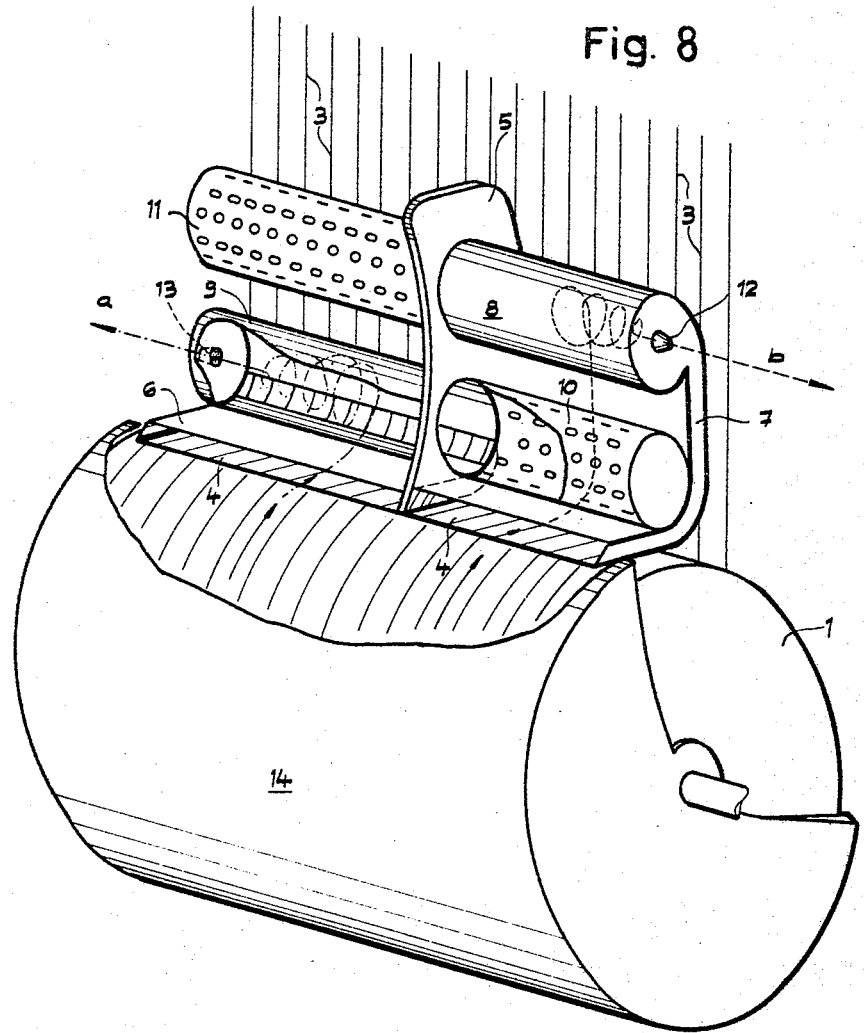
FIG. 8 is a perspective view of the embodiment shown in FIG. 1 and drawn to an enlarged scale.

Referring to FIGS. 1 and 8 there is illustrated therein a rotary drawing drum 1 to which glass filaments 3 are applied, which are derived from the glass rods 2, for example, and the filaments are drawn down to a desired diameter as they pass around the lower surface of the drum from the left side to the right side thereof, as viewed in FIG. 2. An elongated doctor blade or the like extends along the entire length of the drum and engages its right side, as viewed in FIG. 2 for the purpose of deflecting the filaments away from the drum and transforming the continuous filaments into staple fibers of different length as well as for the purpose of deflecting away from the drum the stream of air which is created by the fast rotation of the drum at its exterior surface.

Thus, there is shown in FIG. 2 an elongated blade 4 which extends axially along the drum, from one end to the other end thereof, so as to deflect the filaments 3 away from the drum after they have been drawn thereby.

A pair of elongated hollow guides 6 and 7 are distributed along the drum axially thereof, and these hollow tubular guides each have a width equal to one half the length of the drum with the tubular hollow guides 6 and 7 respectively being aligned with different halves of the drum. The blade 4 is actually formed by portions of the hollow guides 6 and 7 facing and contacting with end edges thereof the periphery of the drum 1. A partition 5 is located in a plane normal to the axis of the drum and is situated between the guides 6 and 7 and forms a common side wall of the same. The guides 6 and 7 have open ends 6a and 7a directed toward the side of the drum from which the filaments are deflected by the blade 4, so that in this way staple fibers are directed together with the stream of air at the exterior of the drum into the hollow tubular guides 6 and 7. A pair of elongated spinning tubes 8 and 9 supported by the partition 5 respectively communicate with the tubular guides 7 and 6 so as to receive the fibers therefrom. As is apparent from FIGS. 1 and 2, not only are the spinning tubes 8 and 9 axially displaced with respect to the drum, in addition they are circumferentially displaced so as to provide a stepped, staggered arrangement for the spinning tubes, and of course the upper spinning tube 8 requires a longer guide 7. The lower spinning tube 9 has connected thereto an elongated air tube 10 which is perforated as shown at 10' and which communicates with and which forms an extension of the spinning tube 9 so that air under pressure in the latter can escape through the perforated tube 10, and of course the guide 7 must extend behind the air tube 10 of the spinning tube 9 to reach the blade 4 from which the staple fibers are directed into the tubular guide 7. Because the tubular guide 7 is longer than the tubular guide 6 it is made of a smaller cross-sectional area than the tubular guide 6 so as to oppose an undesirably large pressure drop of the whirling air which enters into the tube 7 from the periphery of the rotary drum 1. The upper spining tube 8 has also an elongated air tube 11 connected thereto which is perforated as shown at 11' and which forms an extension of the spinning tube 8 and communicates with the interior thereof.

It is also possible in accordance with the invention to provide for the several spinning tubes a plurality of blades or other devices for deflecting the fibers into the guides which lead to the spinning tubes, rather than a single blade 4 which cooperates with all of the tubular guides. With such a construction the individual blades will respectively have lengths corresponding to the extent to which the tubular guides extend along the axis of the rotary drum.

With the particular arrangement shown in FIGS. 1 and 2 the partition 5 is situated midway between the ends of the drum so as to divide the latter into a pair of equal axial zones respective supplying fibers to the pair of guides 6 and 7 and thus to the pair of spinning tubes 9 and 8, respectively, so that substantially the same number of fibers reach each of the spinning tubes. These spinning tubes 8 and 9 respectively have outlet nozzles 12 and 13 through which the slightly twisted slivers *a* and *b* are withdrawn.

Each of the spinning means consists of a cylinder having a length equal to one half the length of the drum and a perforated air tube which forms an extension of this cylinder and which is also equal to one half the length of the drum, so that in each case the assembly of the spinning tube and air tube has a total length corresponding to the length of the drum which of course is no virtual feature of the invention, these air tubes being perforated so that the air can escape therethrough to the outer atmosphere. The partition 5 is formed with openings through which the spinning tube and air tube assemblies pass supported by the partition and the partition 5 does not provide any interruption in the communication between each spinning tube and its air tube. Thus, in the illustrated example the partition 5 will uniformly divide the amount of staple fibers produced by the drum so that an equal number of fibers will be delivered to each of the spinning tubes. In the event anything should happen to the operations the air tubes prevent blowing of slivers in an uncontrolled manner out of the spinning tubes. For example, if the slivers should tear or otherwise become damaged so that the operations do not continue in the proper manner the fibers will simply continue to collect in the air tube without any great damage taking place. Furthermore, excessive air can escape through the perforated air tubes to the outer atmosphere.

In order to facilitate the withdrawal of the slivers *a* and *b*, the nozzles 12 and 13 are situated at opposite ends of the drum and thus are directed in opposite directions. Moreover these nozzles 12 and 13 are located at different angular positions with respect to the axis of the drum.

The structure also includes a trough 14 which receives with clearance the bottom portion of the drum in which the drawing of the filaments take place, this trough serving to guide the air at the periphery of the drum so that the air will be guided in this way to the location where the slivers are withdrawn from the drum, and thus the air at the periphery of the drum also contributes to the formation of the slivers.

Figure 3:
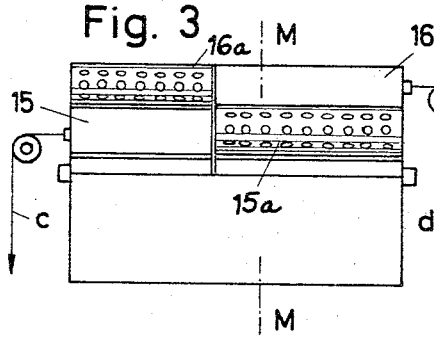
FIG. 3 is a front elevation of a structure which differs from that of FIG. 1 and which is capable of providing slivers of different metric numbers.

As is schematically illustrated in FIG. 3, the partition 5 can be situated at a predetermined distance from the central plane M—M which is normal to the drum axis and situated midway between the end thereof so that in this way the fibers are delivered to spinning tubes 15 and 16 of different lengths and also communicating with perforated air tubes 15*a* and 16*a* respectively, in the manner described above. In this way it is possible to direct to the spinning tube 16 more fibers than are directed to be spinning tube 15, and thus the slivers *c* and *d* obtained with this construction will have different metric numbers.

Figure 4:
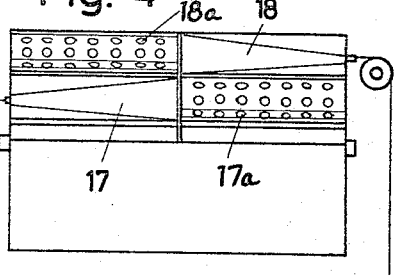
FIG. 4 is a diagrammatic front elevation of another embodiment of a structure according to the invention, the embodiment of FIG. 4 using spinning tubes constructed differently from those of FIGS. 1–3.

FIG. 4 shows how it is possible to use with the structure of the invention conical or funnel-shaped spinning tubes 17 and 18 respectively communicating with perforated air tubes 17*a* and 18*a*.

Figure 5:
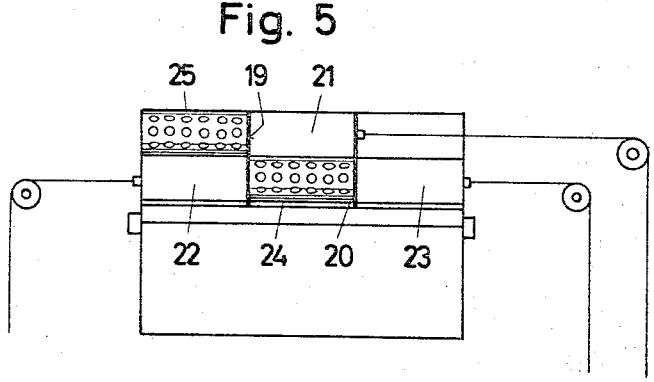
FIG. 5 is a diagrammatic illustration of a structure according to the invention for providing more than two slivers.

With the structure of FIG. 5 there are a pair of partitions 19 and 20 corresponding to the partition 5 and with this construction there will be three hollow guides directing the fibers into three spinning tubes 21, 22, and 23, the spinning tubes 22 and 23 communicating with a common perforated air tube 24 while the spinning tube 21 communicates with the perforated air tube 25, and the outlet nozzles for the slivers are arranged as shown in FIG. 5. Thus, it is possible in this way to derive more than two slivers from a single drum.

Figure 6:
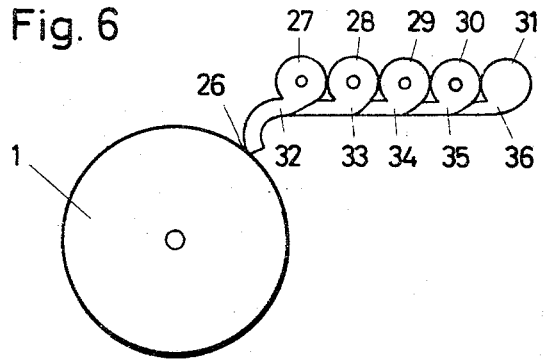
FIG. 6 is a schematic side elevation of a further embodiment capable of producing a relatively large number of slivers from a single drum.
Figure 7:
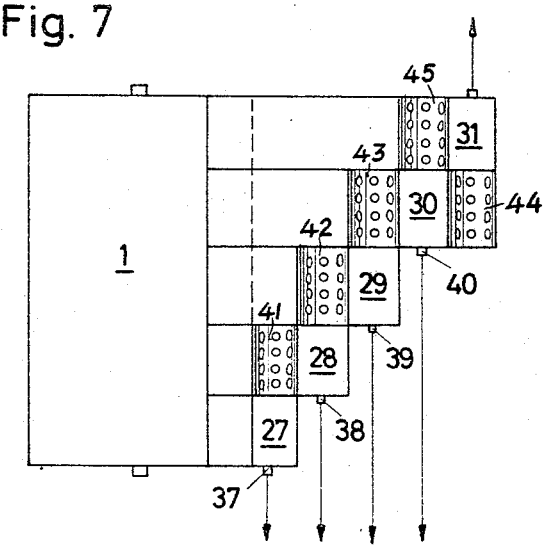
FIG. 7 is a schematic top plan view of the structure of FIG. 6.

FIGS. 6 and 7 show a still further possibility for achieving a relatively large number of slivers from a single drum. In order to simplify the arrangement of the relatively large number of spinning tubes in a pattern, the drawn staple fibers are withdrawn from the drum 1 by an elongated blade 26 which directs them into a plurality of elongated hollow guides which extend substantially horizontally and which are separated from each other by suitable partitions, these guides respectively having different lengths and respectively communicating with the several spinning tubes 27–31 and the elongated blade 26 is formed by end portions of the guides adjacent the periphery of the drum 1. The arrangement of the horizontal guides 32–36 which respectively communicate with the several spinning tubes is apparent from FIGS. 6 and 7. Thus, the blade 26 leads the air as well as the fibers into the several elongated hollow substantially horizontal tubular guides 32–36 which respectively direct the fibers into the spinning tubes 27–31 which respectively communicate with perforated air tubes 41–45 as described above, these air tubes being arranged as shown in the shaded areas in FIG. 7. Inasmuch as the relatively large number of spinning tubes in the stepped pattern shown require the guides 32–36 to be of different lengths, it is preferred to provide different cross-sections for these guides in such a way that the longer guides have smaller cross-sections, so that in this way a pronounced pressure drop of the air which enters into the guides is avoided. Moreover, it is also possible to reduce the diameters of the individual spinning tubes for the same purpose. Furthermore, in order to avoid the pressure drop resulting from the length of the tubular guides it is possible to provide a source of additional air directing air into the several guides at the place where the filaments are deflected from the drum and directed into the several guides.

In the illustrated example the several spinning tubes 27–30 are provided with outlet nozzles 37–40, respectively, from which slivers are all withdrawn in the same direction, while the last spinning tube 31 has an outlet nozzle directed in the opposite direction. It is to be noted that all of the spinning tubes may have the same length and the spinning tubes 27–30 are offset with respect to each other by distances equal to their length.

With the structures of the invention the division of the fibers from a single drum into a plurality of spinning tubes enables the speed of movement of the slivers from the spinning tubes to be greatly reduced. For example, in order to provide a sliver of metric number 10 it was necessary to rotate the drawing drum with a minimum speed of 965 revolutions per minute, but the division of the fibers into a pair of slivers, for example, as shown in FIGS. 1 and 2, enables the speed of rotation of the drum to be reduced to 482 revolutions per minute, while achieving a pair of slivers of the same metric number. Thus, with the structure of the invention it is possible not only to reduce the speed of the drawing drum, but it is possible also to provide several spinning heads or spool winding devices adjacent to a plurality of spinning tubes for receiving the slivers therefrom as compared with conventional structures where a only single sliver is achieved from one single drum.

Moreover, it is possible to combine together the several slivers which are achieved from a single drum with the structure of the invention and then to wind the combined slivers onto a single spool, these combined slivers being twisted together. The slower speed of the slivers provides a much better structure of the spool onto which they are wound.

Furthermore, it is possible with the structure of the invention to directly transmit the slivers from the spinning tubes to flyers which can be directly coupled with the spinning tubes between the latter and devices onto which the spun yarn will be wound, and this result can in particular be achieved without any difficulty with arrangements where three or four spinning tubes are provided for a single drum because of the greatly reduced speed of movement of the slivers, and thus the slivers can be directly spun into yarns by suitable conventional flyers which receive slivers from the spinning tubes. This possibility of directly spinning the slivers into yarns with flyers suitably coupled to the spinning tubes has never before been achieved in the art.

It will be understood that each of the elements described above or two or more together, may also find a useful application in other types of textile machines differing from the types described above.

While the invention has been illustrated and described as embodied in devices for manufacturing slivers it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for manufacturing slivers composed of staple fibers made of glass or similar materials, in combination, a rotary drawing drum for receiving filaments at one side of said drum and drawing said filaments while they pass around said drum to an opposite side thereof; blade means having an edge closely adjacent the periphery of said drum for transforming said filaments into fibers; a plurality of elongated hollow guides axially distributed along said drum and respectively having open ends directed toward said opposite side of said drum for receiving fibers therefrom, so that fibers from predetermined portions of said drum will respectively enter into said hollow guides; a plurality of spinning tubes respectively communicating with said guides for receiving the fibers therefrom; a plurality of perforated air tubes respectively connected to and forming extensions of said spinning tubes and communicating with the interiors thereof; and a partition located in a plane normal to the axis of said drum and formed with openings through which said spinning tubes and said air tubes connected thereto pass supported by said partition, said partition being located at the junctions between said spinning and air tubes, the spining tube of a first communicating spinning and air tube being located on one side of said partition and the air tube on the opposite side of said partition, while the air tube of a second communicating spinning and air tube is located on said one side of said partition and the spinning tube of said second communicating spinning and air tube is located on said opposite side of said partition.

2. In an apparatus for manufacturing slivers composed of staple fibers made of glass or similar materials, in combination, a rotary drawing drum adapted to receive a plurality of filaments at one side of said drum and to draw said filaments while they pass around said drum to an opposite side thereof; an elongated blade extending axially along said drum at said opposite side thereof for separating the drawn filaments from said drum and transforming them into staple fibers and for deflecting a stream of air at the exterior of said drum away from the latter together with the fibers, a plurality of elongated hollow guides communicating with said blade for receiving fibers therefrom, said guides being axially distributed along said drum to respectively receive fibers from predetermined portions thereof; a plurality of partitions normal to the axis of said drum situated between and separating said guides from each other; and a plurality of spinning tubes respectively communicating with said guides and arranged in a step pattern.

3. In an apparatus as set forth in claim 2, and including a plurality of perforated air tubes respectively connected to and forming extensions of said spinning tubes and respectively communicating with the interiors thereof.

4. In an apparatus as set forth in claim 3, wherein said spinning tubes and said air tubes connected thereto are respectively supported by said partitions.

5. In an apparatus as set forth in claim 4, wherein each of said partitions is formed with openings therethrough, said spinning tubes and said air tubes connected to each other respectively extend through said openings, with the spinning tube of each connected spinning and air tube located to one side of the respective partition and the air tube connected to said spinning tube located to the other side of the partition.

6. In an apparatus as set forth in claim 3, wherein each of said spinning tubes has an end wall facing away from the air tube connected thereto and including a spinning nozzle projecting from said end wall and communicating with the interior of said spinning tube.

7. In an apparatus as set forth in claim 3, wherein each of said spinning tubes tapers from the end connected to the respective air tube to the other end thereof.

References Cited
UNITED STATES PATENTS 2,584,517   2/1952   Verreet   19—.56
2,621,444   12/1952   Schuller   19—.58 X

FOREIGN PATENTS 536,990   2/1957   Canada.

MERVIN STEIN, *Primary Examiner.*

DORSEY NEWTON, ROBERT R. MACKEY,
*Examiners.*